(12) United States Patent
Hashimoto et al.

(10) Patent No.: US 7,876,144 B2
(45) Date of Patent: Jan. 25, 2011

(54) START-UP CIRCUIT AND START-UP METHOD

(75) Inventors: Tetsuro Hashimoto, Kyoto (JP); Akihito Ito, Kyoto (JP); Yoshikazu Sasaki, Kyoto (JP); Isao Yamamoto, Kyoto (JP)

(73) Assignee: Rohm Co., Ltd. (JP)

( * ) Notice: Subject to any disclaimer, the term of this patent is extended or adjusted under 35 U.S.C. 154(b) by 930 days.

(21) Appl. No.: 11/801,167

(22) Filed: May 9, 2007

(65) Prior Publication Data

US 2007/0262805 A1    Nov. 15, 2007

(30) Foreign Application Priority Data

May 9, 2006    (JP)    ............... 2006-129858

(51) Int. Cl.
  *H03K 3/00*    (2006.01)
(52) U.S. Cl. .................. 327/296; 327/294; 327/298; 323/234; 712/247; 712/E9.006
(58) Field of Classification Search .................. 327/10, 327/99, 294, 296, 298, 407; 323/234, 283; 712/E9.006, 247; 710/58
See application file for complete search history.

(56) References Cited

U.S. PATENT DOCUMENTS

| | | | | |
|---|---|---|---|---|
| 4,031,521 A | * | 6/1977 | Hall et al. .................. | 712/247 |
| 4,210,846 A | * | 7/1980 | Capewell et al. ............ | 315/121 |
| 5,040,006 A | * | 8/1991 | Matsumura et al. ......... | 396/264 |
| 6,839,394 B1 | * | 1/2005 | Duffy ......................... | 375/376 |
| 7,102,391 B1 | * | 9/2006 | Sun et al. .................... | 327/10 |
| 2009/0256541 A1 | * | 10/2009 | Akyildiz et al. ............. | 323/283 |

FOREIGN PATENT DOCUMENTS

| | | |
|---|---|---|
| JP | 2003-209461 | 7/2003 |
| JP | 2004-22947 | 1/2004 |
| JP | 2004-126922 | 4/2004 |

* cited by examiner

*Primary Examiner*—Chris Chu
(74) *Attorney, Agent, or Firm*—Cantor Colburn LLP

(57) ABSTRACT

A start-up circuit receives a start-up signal instructing start-up of an equipment mounted with the circuit, and executes a predetermined sequence when start-up is instructed by the start-up signal. An oscillator generates a clock signal. A sequence circuit receives the start-up signal and a clock signal output from the oscillator, measures time by counting the clock signal when the start-up signal transits to a predetermined level, and executes a predetermined event at a predetermined timing. The oscillator operates for a period where the start-up signal is at the predetermined level if the start-up signal is at the predetermined level during the period the power key of the equipment mounted with the circuit is being pushed.

8 Claims, 3 Drawing Sheets

16

10

START-UP CIRCUIT AND START-UP METHOD

BACKGROUND OF THE INVENTION

1. Field of the Invention

The present invention relates to a start-up circuit for controlling the sequence on start-up of electronic equipments and the like.

2. Description of the Related Art

A great number of electronic circuits such as CPU (Central Processing Unit) and other DSP (Digital Signal Processor) which perform digital signal processing, liquid crystal panel and other analog circuits are mounted on recent various electronic equipments such as a portable telephones, a PDA (Personal Digital Assistant), a laptop computer. The electronic circuits operate with power supplied from a battery or a power supply circuit for stabilizing the battery voltage.

A stable operation guaranteed voltage is defined for each electronic circuit, and the relevant electronic circuit does not operate properly if the supplied voltage is equal to or lower than the stable operation guaranteed voltage. Therefore, an under voltage lock out (hereinafter referred to as UVLO) function of monitoring the battery voltage etc. and controlling the start-up and terminating sequences of each electronic circuit is installed in such electronic equipment. Related arts are disclosed in Japanese Patent Application Laid-Open Nos. 2004-22947 and 2004-126922 and the like.

[Patent Document 1] Japanese Patent Application Laid-Open No. 2004-22947

[Patent Document 2] Japanese Patent Application Laid-Open No. 2004-126922

[Patent Document 3] Japanese Patent Application Laid-Open No. 2003-209461

The UVLO circuit compares the voltage to be monitored (hereinafter also referred to as monitored voltage) such as the battery voltage with a predetermined threshold voltage, executes a predetermined start-up sequence when the battery voltage becomes higher than a threshold voltage, and executes a predetermined terminating sequence when the battery voltage becomes lower than the threshold voltage. A circuit, which executes the predetermined sequences (hereinafter referred to as start-up circuit in the present specification), is built in the UVLO circuit. The start-up circuit executes a predetermined event at a predetermined order and timing when the UVLO circuit permits starting of start-up.

The start-up circuit needs to measure the time in order to determine the timing of executing the predetermined event. A method for generating a clock signal using an oscillator and counting the clock signals up to a predetermined number is generally used as a method for measuring the time. However, the oscillator uses a lot of electricity so that it may have hindered reducing the power consumption.

SUMMARY OF THE INVENTION

In view of the above problems, a general purpose of the present invention is to provide a start-up circuit with reduced power consumption.

One embodiment of the present invention relates to a start-up circuit which receives a start-up signal instructing start-up of equipment on which the circuit is mounted and executes a predetermined sequence when the start-up is instructed by the start-up signal. The start-up circuit includes an oscillator which generates a clock signal; and a sequence circuit which receives the start-up signal and the clock signal output from the oscillator, measures time by counting the clock signal when the start-up signal transits to a predetermined level, and executes a predetermined event at a predetermined timing. The oscillator operates for a period where the start-up signal is at the predetermined level if the start-up signal is at the predetermined level while a power key of the equipment mounted with the circuit is being pushed.

According to such embodiment, the oscillator is turned ON during the period while the power key is being pushed, and thereafter turned OFF. As a result, the start-up circuit completes a predetermined sequence, and then the oscillator is stopped when the pushing of the power key by the user is terminated, and thus the power consumption by the oscillator is reduced during the period where the clock signal is unnecessary after the termination of the start-up sequence.

In another embodiment, the sequence circuit includes a counter set with a predetermined time-out time, and may stop the operation of the oscillator at a timing of time-out.

According to such embodiment, the oscillator is stopped at the timing of time-out even if the start-up instruction is received other than by the power key, and thus the oscillator is prevented from operating after the start-up sequence is terminated where the clock is unnecessary, whereby the power consumption is reduced.

Still another embodiment of the present invention relates to an under voltage lock out circuit which monitors an input voltage and executes a predetermined sequence when the input voltage meets a predetermined condition. The under voltage lock out circuit includes a voltage comparison unit which compares the input voltage with a predetermined threshold voltage, and outputs a comparison signal; and a start-up circuit according to any one of the above embodiments input with the signal output from the voltage comparison unit. The start-up circuit executes the predetermined sequence when start-up is instructed by the start-up signal in a state the input voltage is higher than the threshold voltage by referring to the comparison signal.

According to such embodiment, the oscillator of the under voltage lock out circuit stops the operation when operation is unnecessary, whereby the power consumption is reduced.

Still another embodiment of the present invention relates to a power supply circuit. The power supply circuit which stabilizes a power supply voltage and supplies the voltage to a load; the power supply circuit including a regulator circuit which stabilizes the power supply voltage and supplies the voltage to the load; and an under voltage lock out circuit according to any one of the above embodiments which controls ON/OFF sequence of the regulator circuit by monitoring the power supply voltage as an input voltage.

In an embodiment, the regulator circuits, and the under voltage lock out circuit may be integrated on a single semiconductor substrate. "Integrated on a single semiconductor substrate" includes a case in which all the components of the circuit are formed on the semiconductor substrate and a case in which the main components of the circuit are integrated on a single semiconductor substrate, and thereby some of the resistors, capacitors etc. for adjustment of the circuit constant may be arranged exterior to the semiconductor substrate. By integrating the power supply circuit as one LSI, the circuit area may be reduced.

Still another embodiment of the present invention relates to electronic equipment. The electronic equipment includes a battery; and the power supply circuit described above which stabilizes the voltage of the battery and supplies the voltage to a load.

Still another embodiment of the present invention relates to a start-up method of monitoring a start-up signal, and executing a predetermined sequence when start-up is instructed. The method includes: starting up an oscillator when the start-up signal transits to a predetermined level for instructing start-up of an equipment; executing a predetermined event at a predetermined timing by counting a clock signal generated by the oscillator; and stopping the oscillator when the start-up signal transits to a level different from the predetermined level if the start-up signal is at the predetermined level while a power key of the equipment mounted with the circuit is being pushed.

The start-up method of one embodiment may further include stopping the operation of the oscillator after a predetermined time-out period has elapsed by counting the clock generated by the oscillator.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
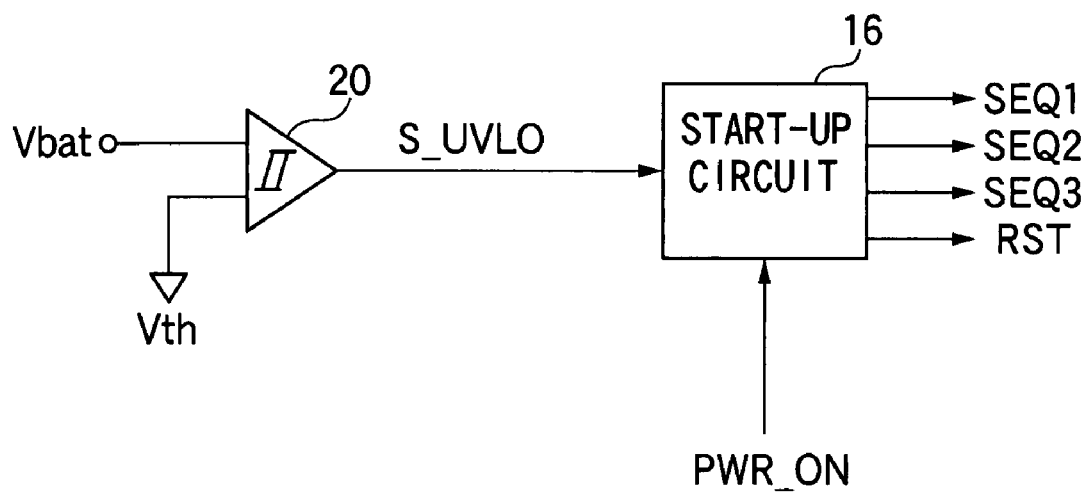
FIG. 1 is a circuit diagram showing a configuration of an UVLO circuit according to the embodiment.

The invention will now be described based on preferred embodiments which do not intend to limit the scope of the present invention but exemplify the invention. All of the features and the combinations thereof described in the embodiment are not necessarily essential to the invention.

The under voltage lock out circuit according to the embodiment of the present invention will now be described with reference to the drawings. The same reference characters are denoted for the same or equivalent components, members, processes shown throughout the drawings, and descriptions will not be repeated to eliminate overlapping description.

Figure 2:
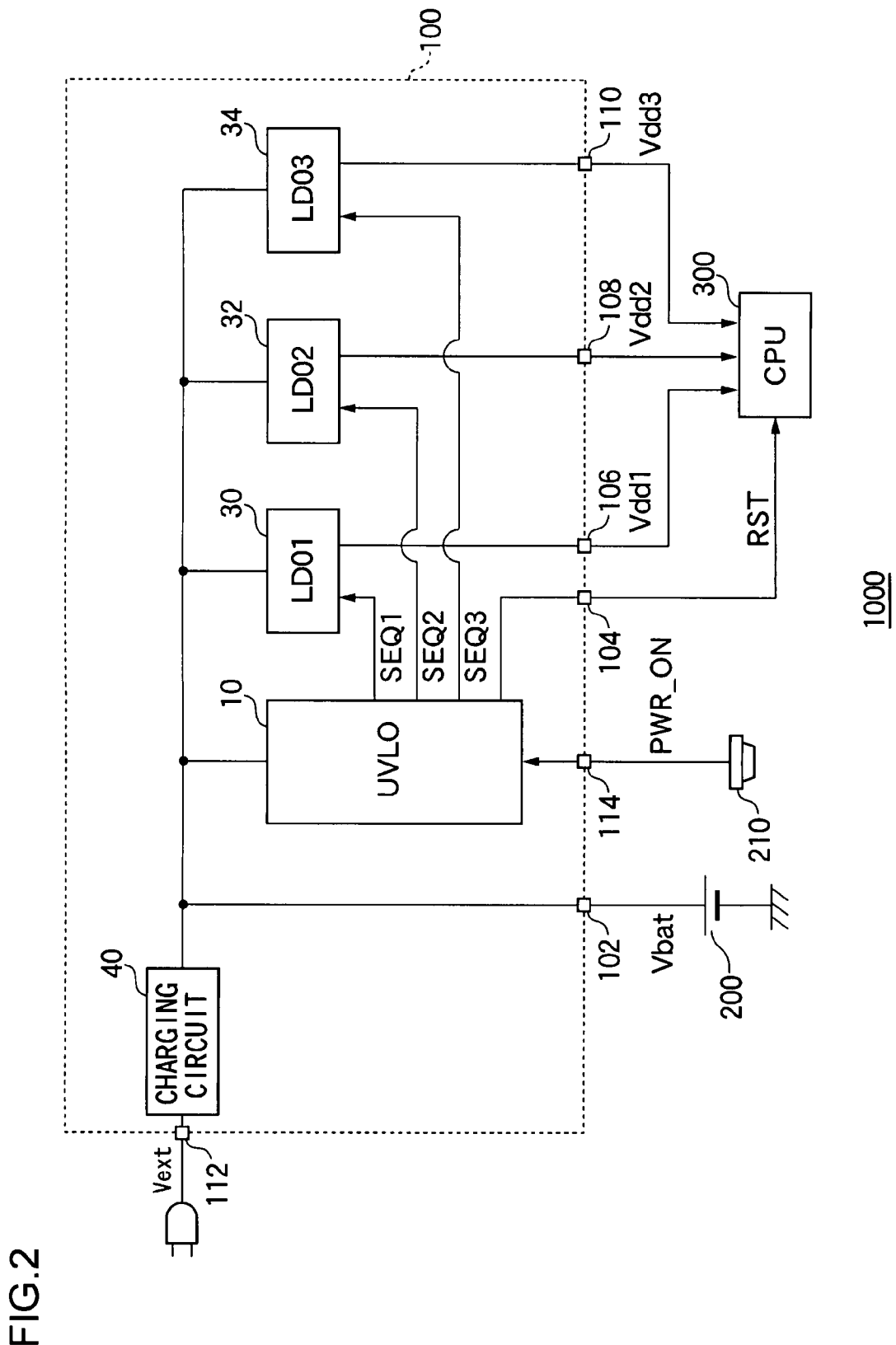
FIG. 2 is a block diagram of a power supply circuit in which the UVLO circuit of FIG. 1 is suitably used and the entire electronic equipment.

FIG. 1 is a circuit diagram showing a configuration of an UVLO circuit 10 according to the embodiment. FIG. 2 is a block diagram of a power supply circuit 100 in which the UVLO circuit 10 of FIG. 1 is suitably used and the entire electronic equipment 1000. First, the configuration of the entire electronic equipment 1000 will be described with reference to FIG. 2. The electronic equipment 1000 is a battery driven type information terminal equipment such as portable telephone terminal, PDA, or laptop. The electronic equipment 1000 includes the power supply circuit 100, a battery 200, a power key 210, and a CPU 300.

The CPU 300 is a processor which controls the entire electronic equipment 1000 and executes various arithmetic processes, and such CPU 300 is driven by power supply voltages with Vdd1 to Vdd3 supplied by the power supply circuit 100. The power supply voltages Vdd1 to Vdd3 are hereinafter also simply referred to as power supply voltage Vdd. The CPU 300 is configured so that each circuit block may be operated with different voltage, and is also configured to individually turn ON/OFF the power supply. For instance, the power supply voltages Vdd1 to Vdd3 are each supplied to a core block, a memory block, and an input/output (I/O) block. A reset signal RST is also input to the CPU 300 from the power supply circuit 100. The reset signal RST is a signal that notifies the CPU 300 that supply of power supply voltage Vdd is completed or notifies the under voltage state from the power supply circuit 100.

The load driven by the power supply circuit 100 is actually not limited to the CPU 300, and in place thereof or in addition thereto, other DSP, light emitting diode and the like may be driven.

The power key 210 is an input device for a user to instruct ON/OFF of the power of the electronic equipment 1000, where start-up is triggered when the user hold the power key 210 pushed over a predetermined time Tp1 with the electronic equipment 1000 in the non-operating state. The power key 210 outputs a start-up signal (power ON signal) PWR_ON, which is at high level while the power key 210 is being pushed, to the power supply circuit 100.

The battery 200 is a secondary battery such as Li ion battery that outputs a battery voltage Vbat of about 2V to 4.2V. The battery voltage Vbat drops by power consumption and rises by charging.

The power supply circuit 100 includes a battery terminal 102, a reset terminal 104, power supply terminals 106, 108, 110, an AC terminal 112 and a power ON terminal 114 as input/output terminals. The battery 200 is connected to the battery terminal 102. The reset terminal 104, and the power supply terminals 106, 108, 110 are all connected to the CPU 300. The AC terminal 112 is connected to an external power supply circuit. The external power supply circuit is a so-called AC adapter which converts a commercial AC voltage to a DC voltage. The start-up signal PWR_ON is input to the power ON terminal 114.

The power supply voltage Vdd supplied to the CPU 300 needs be stabilized at a predetermined voltage of 2V or lower. The battery voltage Vbat of the battery is about 2V to 4.2V. The power supply circuit 100 decreases the battery voltage Vbat supplied from the battery 200, stabilizes the voltage to a constant value that does not depend on the value of the battery voltage Vbat, and supplies the voltage to the CPU 300.

The power supply circuit 100 includes the UVLO circuit 10, a first regulator circuit 30, a second regulator circuit 32, a third regulator circuit 34 and a charging circuit 40. The DC voltage Vext is supplied to the charging circuit 40 when the AC adapter is connected to the AC terminal 112. In this case, the charging circuit 40 supplies the charged current to the battery 200 to charge the battery 200 up to about 4.2V.

The battery voltage Vbat is supplied to the first regulator circuit 30, the second regulator 32 and the third regulator circuit 34 via the battery terminal 102. Each of the first regulator circuit 30, the second regulator 32 and the third regulator circuit 34 is a linear regulator that decreases the battery voltage Vbat, and outputs the stabilized power supply voltages Vdd1 to Vdd3 to the CPU 300 via the power supply terminal 106, 108, 110.

The UVLO circuit 10 is input with the battery voltage Vbat serving as the input voltage, and is also input with the start-up signal PWR_ON.

The UVLO circuit 10 monitors the battery voltage Vbat, and determines whether or not the monitoring battery voltage Vbat meets a predetermined condition. The UVLO circuit 10 executes a predetermined sequence when the start-up signal PWR_ON is at high level in a state the battery voltage Vbat meets the predetermined condition. In the present embodiment, the UVLO circuit 10 starts-up the first regulator circuit 30, the second regulator circuit 32, and the third regulator circuit 34 in this order when the battery voltage Vbat is higher than a predefined threshold voltage, and outputs the reset signal RST to the CPU 300 after the start-up is completed.

The UVLO circuit 10 outputs a first sequence signal SEQ1, a second sequence signal SEQ2, and a third sequence signal SEQ3 respectively to the first regulator circuit 30, the second regulator circuit 32 and the third regulator circuit 34. The UVLO circuit 10 switches the first sequence signal SEQ1 to third sequence signal SEQ3 to high level when ready to start-up The first regulator circuit 30 to the third regulator circuit 34 start the stabilizing operation and output the power supply voltages Vdd1 to Vdd3 when input with the sequence signals SEQ1 to SEQ3 of high level.

Returning again to FIG. 1, the configuration and the operation of the UVLO circuit 10 will now be described. The UVLO circuit 10 includes a voltage comparison unit 20, a start-up circuit 16 and a voltage control unit 18.

The voltage comparison unit 20 compares the battery voltage Vbat serving as the input voltage with a predetermined threshold voltage Vth, and outputs a UVLO signal (hereinafter also referred to as comparison signal) S_UVLO, which is at high level when Vbat>Vth. The threshold voltage Vth in the voltage comparison unit 20 may be appropriately switched according to the state of the power supply circuit 100. For instance, hysteresis is set in the threshold voltage Vth. The voltage comparison unit 20 may directly compare the battery voltage Vbat with the threshold voltage Vth, or may divide the battery voltage Vbat by means of resistor and the like, and compare the divided voltage with the threshold voltage Vth. The battery voltage Vbat is assumed to be directly compared in the present embodiment.

The threshold voltage Vth of the voltage comparison unit 20 can be switched between a first voltage value Vth1 and a second voltage value Vth2 set lower than the first voltage value Vth1 in the present embodiment. The first voltage value Vth1 is set to be higher than a voltage at which the CPU 300 can operate and can transit from a non-start-up state to a start-up state. The second voltage value Vth2 is set to be higher than a voltage at which the CPU 300 cannot transit from the non-start-up state to the start-up state, but can operate. Vth1>Vth2 is met if the first and second voltage values are set to meet such condition. The first voltage value Vth1 and the second voltage value Vth2 are appropriately set according to a voltage at which the CPU 300 can stably operate, and are set to Vth1=2.4V, Vth2=2.8V, for example.

The start-up circuit 16 receives the comparison signal S_UVLO output from the voltage comparison unit 20, and the start-up signal PWR_ON instructing the start-up of the electronic equipment 1000 mounted with the UVLO circuit 10. The start-up circuit 16 sets the first sequence signal SEQ1 to the third sequence signal SEQ3 to high level in this order when the start-up signal PWR_ON is at high level in a state the UVLO signal S_UVLO is at high level, that is, Vbat>Vth thereby instructing start-up, and thereafter sets the reset signal RST to high level.

Figure 3:
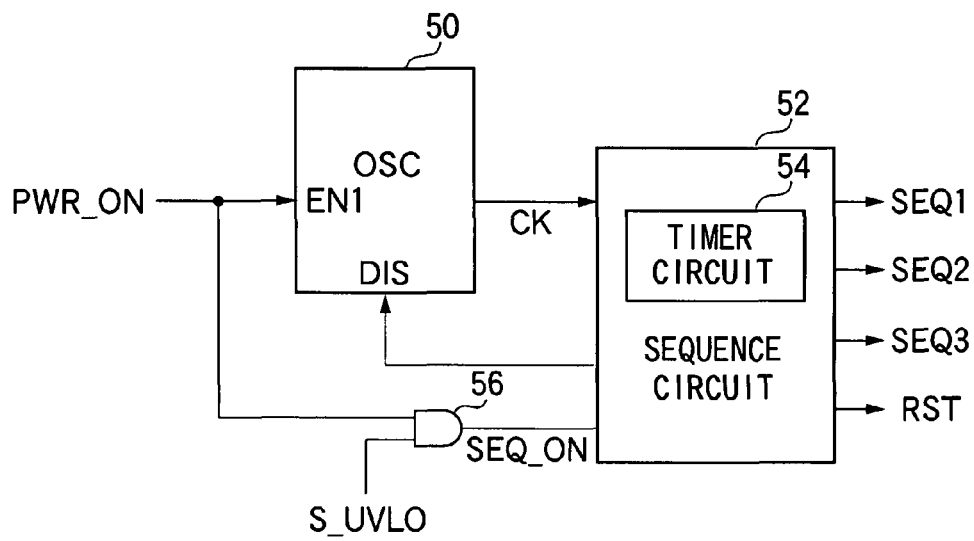
FIG. 3 is a circuit diagram showing a configuration of a start-up circuit according to the embodiment.

FIG. 3 is a circuit diagram showing the configuration of the start-up circuit 16 according to the embodiment. The start-up circuit 16 executes a predetermined sequence when the start-up signal PWR_ON is at high level in a state the comparison signal S_UVLO is at high level, that is, in a state the battery voltage Vbat is higher than the threshold voltage Vth, thereby instructing start-up. The start-up circuit 16 includes an oscillator 50, a sequence circuit 52 and an AND gate 56.

The oscillator 50 has an enable terminal EN, and generates a clock signal CK. The oscillator 50 is in the operating state while high level is input to the enable terminal, and starts the generation of the clock signal CK.

The AND gate 56 outputs a logical product of the comparison signal S_UVLO and the start-up signal PWR_ON as the sequence ON signal SEQ_ON. The sequence circuit 52 receives the sequence ON signal SEQ_ON and the clock signal CK output from the oscillator 50. When the start-up signal PWR_ON transits to high level and the sequence ON signal SEQ_ON is at high level, the sequence circuit 52 counts the clock signal CK to measure the time by means of an internal timer circuit 54, and at a predetermined timing, sequentially switches the first sequence signal SEQ1 to the third sequence signal SEQ3 and the reset signal RST to high level.

A time-out time Tp3 is set in the timer circuit 54. The timer circuit 54 counts the clock signal CK, and transmits a signal to a disable terminal DIS of the oscillator 50 at the timing of time-out to stop the operation of the oscillator 50. The time-out time Tp3 is set to be sufficiently longer than a time Tp2 required for the start-up sequences by the start-up circuit 16.

Figure 4:
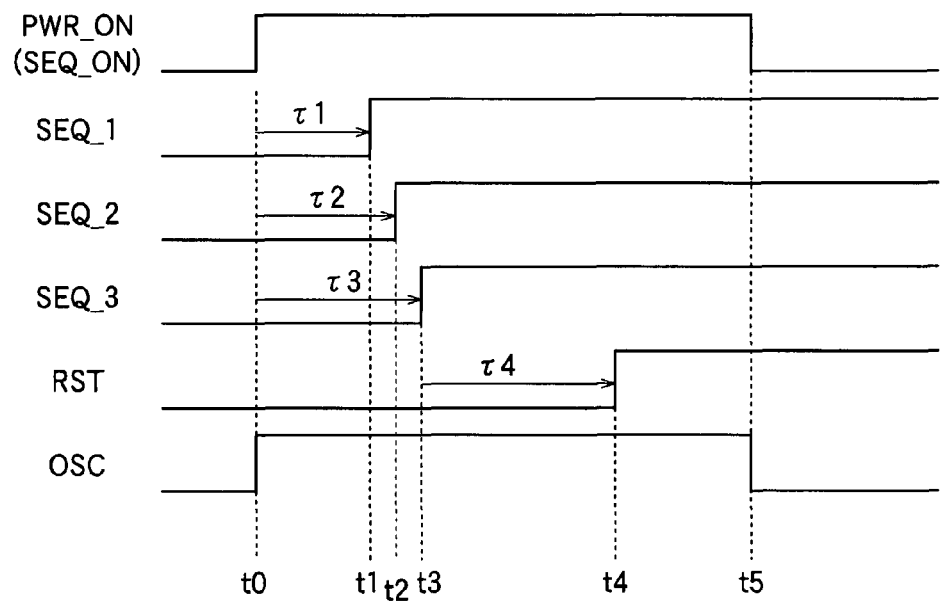
FIG. 4 is a time chart showing an operation state on start-up of a power supply circuit including the UVLO circuit according to the present embodiment.

The operation of the power supply circuit 100 configured as above will now be described. FIG. 4 is a time chart showing the operation state during the start-up of the power supply circuit 100 including the UVLO circuit 10 according to the present embodiment.

FIG. 4 shows the start-up signal PWR_ON, the first sequence signal SEQ1, the second sequence signal SEQ2, the third sequence signal SEQ3, the reset signal RST, and the operation state of the oscillator 50 in this order from the top. In the time chart of FIG. 4, Vbat>Vth is assumed to be satisfied, and thus, the logic value of the start-up signal PWR_ON and the logic value of the sequence ON signal SEQ_ON are assumed to be equal.

The start-up signal PWR_ON transits to high level when the user pushes the power key 210 at time t0. In response thereto, the oscillator 50 starts to operate, and starts to generate the clock signal CK. The sequence circuit 52 starts counting the clock signal CK to measure the time by the sequence ON signal SEQ_ON that transits to high level at time t0. The sequence circuit 52 switches the first sequence signal SEQ1 to high level at time t1 after time τ1 has elapsed from time t0, switches the second sequence signal SEQ2 to high level at time t2 after time τ2 has elapsed, switches the third sequence signal SEQ3 to high level at time t3 after time τ3 has elapsed, thereby sequentially starting up the first regulator circuit 30, the second regulator circuit 32 and the third regulator circuit 34 to supply the voltages to the CPU 300.

Furthermore, the sequence circuit 52 switches the reset signal RST to high level at time t4 after time τ4 has elapsed from time t3 at when start-up is instructed to the third regulator circuit 34, and notifies the completion of the start-up to the CPU 300.

Subsequently, when the user stops pushing the power key 210 at time t5, the start-up signal PWR_ON transits to low level, whereby the oscillator 50 stops.

According to the power supply circuit 100 of the present embodiment, the oscillator 50 is turned ON in period t0 to t1 while the power key 210 is being pushed, and is thereafter turned OFF. In order to recognize that the pushing of the power key is effective, the time at which the key is to be held pushed is assumed as time Tp1, and the time until a series of start-up sequences is completed is assumed as Tp2. If the condition of Tp1>Tp2 is met, the start-up signal PWR_ON transits to low level after the start-up sequences are completed, whereby the oscillator 50 is appropriately operated during the start-up sequences, and the oscillator 50 is stopped after the completion of the start-up sequences. Consequently, the power consumption by the oscillator 50 is reduced during the period the clock signal CK is not necessary after the termination of the start-up sequences.

Moreover, by setting the time-out time Tp3 in the timer circuit 54, the oscillator 50 is appropriately stopped after the completion of the start-up even if the power key 210 is held pushed by the user. And by setting the time-out time, the oscillator 50 can be operated corresponding to the start-up signal from other than the power key 210. For instance, the start-up signal may be a signal that changes according to the state of the connector arranged for connection with the external equipment of the portable telephone terminal. In this case as well, the oscillator 50 is reliably stopped by setting the time-out time longer than the completion time Tp2 of the start-up sequences by the start-up circuit 16.

The circuit is simplified in the present embodiment since ON/OFF of the oscillator 50 is directly associated with whether or not the power key 210 is pushed. The function of stopping the oscillator 50 with time-out also utilizes the timer circuit 54 inside the start-up circuit 16, and thus reducing power consumption is achieved without increasing the circuit size.

The present invention has been described based on the embodiment, but the embodiment merely shows the principle and the application of the present invention, and it should be appreciated that various modifications and changes in arrangement may be made within the scope not departing from the technical concept of the present invention defined in the Claims.

A case of controlling the sequence of supplying the power supply voltages to the CPU 300 has been described in the embodiment, but the present invention is not limited thereto, and start-up and terminating sequences on a different circuit block may be controlled.

The first regulator circuit 30 to the third regulator circuit 34 of the power supply circuit 100 may be a series regulator (LDO: Low Drop Output), or may be a switching regulator. Alternatively, the regulator circuit maybe a charge pump circuit.

Moreover, the application of the UVLO circuit 10 according to the embodiment is not limited to the power supply circuit 100, and may be used in various applications for controlling the start-up sequence of other circuit blocks by monitoring the input voltage.

The input voltage monitored by the UVLO circuit 10 is not limited to the voltage output from the battery, and may be other voltages. In the embodiment, the signal PWR_ON corresponding to the state of the power key is provided as the start-up signal, but the UVLO circuit 10 may reference other start-up signals. A signal corresponding to a state of whether or not the battery 200 is being charged is an example of another start-up signal. This can be determined based on whether or not the voltage is supplied to the AC terminal 112. The UVLO circuit 10 may switch the threshold voltage Vth based on the signal obtained as a result of performing logical operation on a plurality of start-up signals and the comparison signal S_UVLO.

The setting of the logic values of high level and low level in the present embodiment is one example, and may be freely changed by appropriately inverting the same with an inverter and the like.

While the preferred embodiments of the present invention have been described using specific terms, such description is for illustrative purposes only, and it is to be understood that changes and variations may be made without departing from the spirit or scope of the appended claims.

What is claimed is:

1. A start-up circuit which receives a start-up signal instructing start-up of equipment on which the circuit is mounted and executes a predetermined sequence when the start-up is instructed by the start-up signal; the start-up circuit comprising:
   an oscillator which generates a clock signal; and
   a sequence circuit which receives the start-up signal and the clock signal output from the oscillator, measures time by counting the clock signal when the start-up signal transits to a predetermined level, and executes a predetermined event at a predetermined timing; wherein
   the start-up signal is at the predetermined level during a period a power key of the equipment mounted with the circuit is being pushed, and the oscillator operates for a period where the start-up signal is at the predetermined level.

2. The start-up circuit according to claim 1, wherein the sequence circuit comprises a counter set with a predetermined time-out time, and stops the operation of the oscillator at a timing of time-out.

3. An under voltage lock out circuit which monitors an input voltage and executes a predetermined sequence when the input voltage meets a predetermined condition; the under voltage lock out circuit comprising:
   a voltage comparison unit which compares the input voltage with a predetermined threshold voltage, and outputs a comparison signal; and
   a start-up circuit which receives a start-up signal instructing start-up of equipment on which the circuit is mounted and executes a predetermined sequence when the start-up is instructed by the start-up signal; the start-up circuit comprising:
   an oscillator which generates a clock signal; and
   a sequence circuit which receives the start-up signal and the clock signal output from the oscillator, measures time by counting the clock signal when the start-up signal transits to a predetermined level, and executes a predetermined event at a predetermined timing;
      wherein the start-up signal is at the predetermined level during a period a power key of the equipment mounted with the circuit is being pushed, and the oscillator operates for a period where the start-up signal is at the predetermined level;
   wherein the comparison signal output from the voltage comparison unit is input into the start-up circuit; and
   the start-up circuit executes the predetermined sequence when start-up is instructed by the start-up signal in a state the input voltage is higher than the threshold voltage by referring to the comparison signal.

4. A power supply circuit, which stabilizes a power supply voltage and supplies the voltage to a load; the power supply circuit comprising:
   a regulator circuit which stabilizes a power supply voltage and supplies to the load; and
   an under voltage lock out circuit comprising:
      a voltage comparison unit which compares the input voltage with a predetermined threshold voltage, and outputs a comparison signal; and
      a start-up circuit which receives a start-up signal instructing start-up of equipment on which the circuit is mounted and executes a predetermined sequence when the start-up is instructed by the start-up signal; the start-up circuit comprising:

an oscillator which generates a clock signal; and
a sequence circuit which receives the start-up signal and the clock signal output from the oscillator, measures time by counting the clock signal when the start-up signal transits to a predetermined level, and executes a predetermined event at a predetermined timing;
wherein the start-up signal is at the predetermined level during a period a power key of the equipment mounted with the circuit is being pushed, and the oscillator operates for a period where the start-up signal is at the predetermined level;
wherein the comparison signal output from the voltage comparison unit is input into the start-up circuit; and
the start-up circuit executes the predetermined sequence when start-up is instructed by the start-up signal in a state the input voltage is higher than the threshold voltage by referring to the comparison signal;
wherein the under voltage lock out circuit is structured to control ON/OFF sequence of the regulator circuit by monitoring the power supply voltage as an input voltage.

5. The power supply circuit according to claim 4, wherein the regulator circuits, and the under voltage lock out circuit are integrated on a single semiconductor substrate.

6. An electronic equipment comprising:
a battery; and
a power supply circuit comprising:
   a regulator circuit which stabilizes a power supply voltage and supplies to the load; and
   an under voltage lock out circuit comprising:
      a voltage comparison unit which compares the input voltage with a predetermined threshold voltage, and outputs a comparison signal; and
      a start-up circuit which receives a start-up signal instructing start-up of equipment on which the circuit is mounted and executes a predetermined sequence when the start-up is instructed by the start-up signal; the start-up circuit comprising:
         an oscillator which generates a clock signal; and
         a sequence circuit which receives the start-up signal and the clock signal output from the oscillator, measures time by counting the clock signal when the start-up signal transits to a predetermined level, and executes a predetermined event at a predetermined timing;
      wherein the start-up signal is at the predetermined level during a period a power key of the equipment mounted with the circuit is being pushed, and the oscillator operates for a period where the start-up signal is at the predetermined level;
      wherein the comparison signal output from the voltage comparison unit is input into the start-up circuit; and
      the start-up circuit executes the predetermined sequence when start-up is instructed by the start-up signal in a state the input voltage is higher than the threshold voltage by referring to the comparison signal;
   wherein the under voltage lock out circuit is structured to control ON/OFF sequence of the regulator circuit by monitoring the power supply voltage as an input voltage; and
   wherein the regulator circuits, and the under voltage lock out circuit are integrated on a single semiconductor substrate;
wherein the power supply circuit stabilizes the voltage of the battery and supplies the voltage to a load.

7. A start-up method of monitoring a start-up signal, and executing a predetermined sequence when start-up is instructed, the method comprising:
   starting up an oscillator when the start-up signal transits to a predetermined level for instructing start-up of an equipment;
   executing a predetermined event at a predetermined timing by counting a clock signal generated by the oscillator; and
   stopping the oscillator when the start-up signal transits to a level different from the predetermined level, wherein
      the start-up signal is at the predetermined level while a power key of the equipment mounted with the circuit is being pushed.

8. The start-up method according to claim 7, further comprising stopping the operation of the oscillator after a predetermined time-out period has elapsed by counting the clock generated by the oscillator.

* * * * *